Feb. 24, 1948.     R. E. UTTER ET AL     2,436,462
REMOTE CONTROLLED PARKING WINDSHIELD WIPER MOTOR
Filed Dec. 1, 1944     3 Sheets-Sheet 1

INVENTORS
RAYMOND E. UTTER &
D. HENRY STOLTENBERG
BY Salvey, Souther & Stoltenberg
ATTORNEYS Patented Feb. 24, 1948

2,436,462

UNITED STATES PATENT OFFICE 2,436,462

REMOTE CONTROLLED PARKING WIND-
SHIELD WIPER MOTOR

Raymond E. Utter and Delbert Henry Stoltenberg,
Toledo, Ohio

Application December 1, 1944, Serial No. 566,068

2 Claims. (Cl. 121—97)

This invention relates to windshield wiper motors, more particularly to motors operated by fluid pressure which are automatically parked when in inoperative condition under control of a segregated manual control at a point remote of the motor.

In the prior art, manifold vacuum operated motors were manually controlled from a remote point by the use of a manually controlled linkage which actuated a control valve mounted on the case of the motor, so that the valve position determined the operative and parking conditions of the motor and also throttling to control the speed of operation of the motor. This control system was not entirely reliable inasmuch as the linkage was made separable to facilitate mounting and often the linkage separated while in use so that an operator lost control over the motor. Furthermore, the linkage is generally subject to considerable lost motion which resulted in erratic control, particularly when throttling was attempted.

Other remote manual control means in the prior art comprised a remote manually operated control valve having an operating conduit and a parking conduit leading to the motor which were selectively connected by the manual control valve to a source of vacuum to operate, throttle, and park the motor. This construction makes necessary the use of a fluid-pressure operated valve means at the motor to obtain effective parking of the motor which gave rise to a complicated and sensitive device which was subject to breakdown even with the most careful attention to manufacturing design. This was particularly true with reference to the fluid-pressure operated valve means on the motor.

The present invention contemplates the provision of a simple and effective remote manual control means which is insensitive and not subject to breakdown by the use of complicated mechanical linkages or sensitive fluid-pressure operated valve means. It further contemplates the provision of a control means in which both throttling and parking of the motor are reliably and simply obtained.

It is, therefore, a principal object of this invention to provide a remote manual control means for a fluid-pressure operated windshield wiper motor which is simple and reliable and suitable for mass production.

It is a further object of this invention to provide a remote manual control valve for a fluid-pressure operated motor which is in communication with the motor by a multiplicity of conduits all combined into one envelope.

It is a further object of this invention to provide a remote manual control means for a fluid-pressure operated windshield wiper motor which is in communication with the motor by a multiplicity of conduits all combined into one envelope which will allow an operator to control the operation and parking of the motor and also to throttle to control the speed of operation.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawings forming a part of this specification wherein like reference characters designate corresponding parts in the several views.

Figure 1:
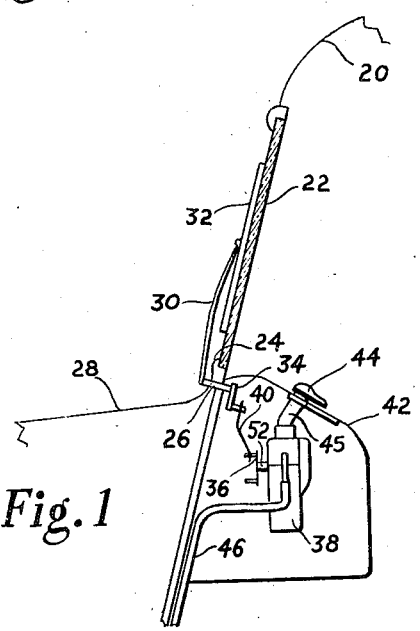
Fig. 1 is an elevational view, partly in section, showing an application of the invention to an automobile.

Referring now to the drawings, particularly to Fig. 1, an automobile body section 20 is shown having a windshield 22 with a lower edge 24, adjacent which a pivot 26 is mounted in the cowl member 28, having mounted thereon on its outer end a windshield wiper arm 30 for driving a blade 32 over the outer surface of the windshield in an arc as is well known in the art. The inner end of the pivot 26 is provided with an arm 34, or the like, which is connected to a driver arm 36 on a fluid-pressure operated motor 38 by a linkage 40. The motor 38 is mounted in any convenient manner (not shown) to the frame of the automobile and furnishes the power to move the blade 32 over the surface of the windshield and to park the same adjacent the lower edge 24. The motor is concealed under a dash 42 and is provided with a manual control 44 connected to the motor by a multi-passage conduit 45 as will be described in greater detail hereinafter. A conduit 46 is provided to communicate with the manual control 44 or motor 38 and the intake manifold of the automobile motor (not shown) to utilize the suction therein for driving the windshield wiper motor.

Figure 2:
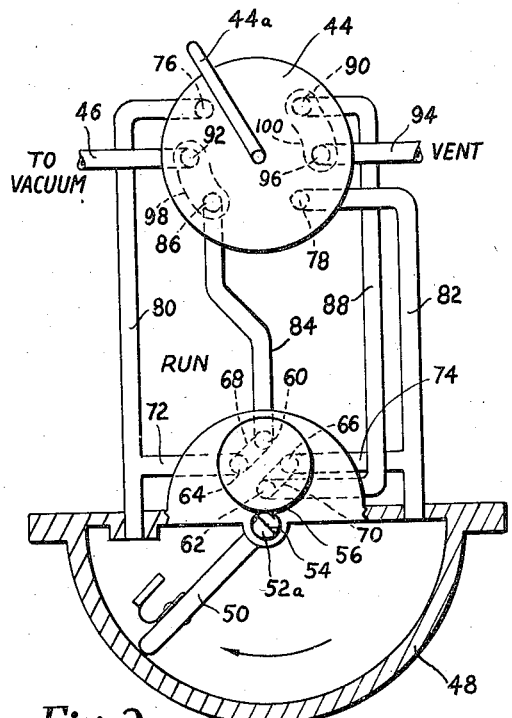
Fig. 2 is an elevational view, partly in section, of a motor incorporating the invention.
Figure 3:
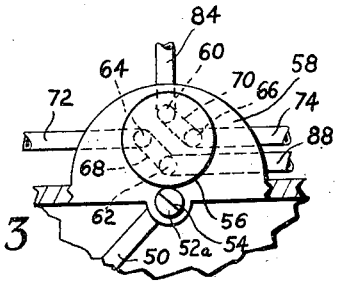
Fig. 3 is an elevational view of a detail.

The motor 38 may have a casing 48 of semi-circular contour as shown in Figs. 2 and 3 having therein a movable vane or piston 50 oscillatable about a shaft 52 journaled in a bearing in the casing. These details of construction of the casing and piston are well known in the art and may be varied widely. The driver arm 36 is attached to one end of shaft 52 (Fig. 1) which projects a substantial distance from the casing. On the other end 52a of the shaft a non-circular portion 54 is provided which drives an automatic valve control mechanism (not shown) which may be similar to any of the control mechanisms well known in the art, usually involving an overcenter device which snaps over from one position to another through a lost motion connection with shaft 52 after the shaft has been oscillated by the piston 50 through a predetermined angle. This automatic control mechanism moves a flop valve 56 through an angle around the shaft 52 on which the valve is pivoted sufficiently to reverse the application of a fluid-pressure differential to the two sides of the piston 50 in the chambers formed thereby in the casing 48.

The casing 48 is provided with a valve seat 58 on which the flop valve 56 moves under the influence of the automatic control mechanism to reverse the application of a fluid-pressure differential active on the vane 50. The valve seat is pierced by four apertures or ports, a suction supply port 60, a vent port 62, and a pair of chamber ports 64 and 66 communicating with the left and right chambers formed in the casing 48 by the vane 50. The flop valve 56 may be a disk having a pair of ducts 68 and 70 on its inner face adjacent the valve seat 58, being adapted in one position to place ports 60 and 64 in communication by duct 68 (Fig. 2) and ports 62 and 66 by duct 70. In the other position of the valve (Fig. 3) ports 62 and 64 are placed in communication by duct 68 and ports 60 and 66 by duct 70.

Ports 64 and 66 are placed in communication with the left and right hand chambers by conduits 72 and 74 respectively, said conduits also leading to ports 76 and 78 respectively in the valve seat of manual control valve 44 by means of conduits 80 and 82. Suction supply port 60 is in communication with conduit 84 which terminates in port 86 also in the valve seat of the manual control valve. Similarly, vent port 62 is in communication with conduit 88 which terminates in port 90 also in the manual control valve 44. Conduit 46 leading from the source of suction terminates in port 92 in the valve seat positioned midway between ports 76 and 86, while a vent 94 terminates in port 96 in the valve seat positioned midway between ports 78 and 90. The movable portion 44a of the manual control valve is provided with a pair of ducts 98 and 100, positioned relative to each other and to the ports in the valve seat so that in one position of the movable portion 44a, duct 98 places ports 86 and 92 in communication while duct 100 places ports 90 and 96 in communication. This constitutes the running position of the motor and is shown substantially in Figs. 2 and 3, wherein the flop valve 56 is shown in each of its two positions. The flop valve 56 moves through a ninety degree angle to assume the positions shown in Figs. 2 and 3 and may move clockwise or counterclockwise from the position shown in Fig. 2 to the position shown in Fig. 3, the counterclockwise motion being illustrated.

With the manual control valve in the position shown in Fig. 2, vacuum is applied to the left chamber of the motor through port 92, duct 98 to port 86, then through conduit 84 to port 60 of the valve seat 58, then through duct 68 of the flop valve to port 64 also in the valve seat 58, and then through conduit 72 to the chamber side, conduit 80 being isolated by the closing of port 76. The atmosphere is led to the right chamber of the motor from port 96 through duct 100 to port 90, then through conduit 88 to port 62 in the valve seat 58, then through duct 70 in the flop valve 56 to port 66 also in the valve seat 58, then through conduit 74 to the chamber, conduit 82 being isolated by the closing of port 78. This pressure differential causes vane 50 to move in a clockwise direction. At a predetermined position of the stroke, the automatic valve control (not shown) moves the flop valve in counterclockwise direction to the position shown in Fig. 3, which reverses the application of the pressure differential causing the vane 50 to move in a counterclockwise direction. The flop valve 56 will again be actuated at a predetermined position of the vane back to the position shown in Fig. 2, which will give an oscillatory motion to the shaft 52 to drive the wiper blade 32 through the crank link and pivot arrangement already described.

Figure 4:
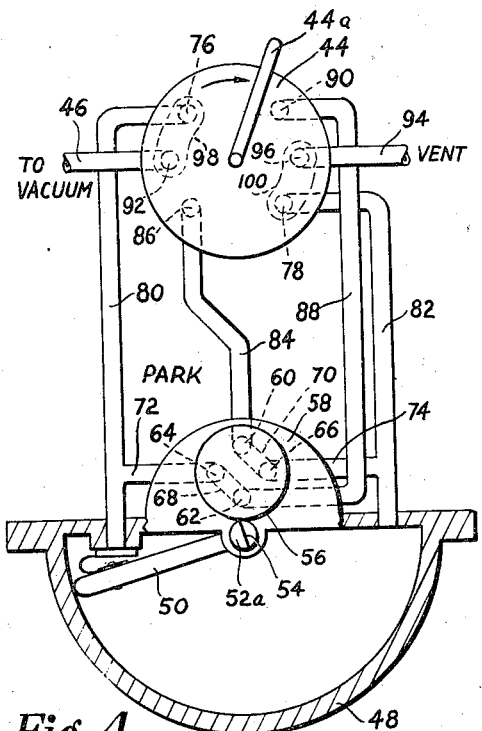
Fig. 4 is an elevational view, partly in section, of the motor in parked position.

When the operator desires to park the wiper blade 32 adjacent the lower edge 24 of the windshield, he moves the movable portion 44a of the manual control valve 44 in a clockwise direction to the position shown in Fig. 4 so that duct 98 places ports 92 and 76 in communication while duct 100 places ports 96 and 78 in communication. Ports 90 and 86 are closed by the same action. This places vacuum directly on the left chamber of the motor through port 92, duct 98 to port 76, then by conduit 80 to the chamber. Conduit 72 will be isolated by the closing of ports 86 and 90, no matter in what position the flop valve will be found. Atmosphere is led to the right side through port 96, duct 100 to port 78, then by conduit 82 to the right chamber. Conduit 74 will be isolated by the closing of ports 86 and 90 as described with reference to conduit 72. This will park the vane on the left side substantially as shown in Fig. 4. When the operator wishes to again start the motor, he moves the manual control valve back to its position in Fig. 2. Throttling of the motor may be obtained by careful manipulation of the movable portion 44a to partially close the ports.

Conduits 80, 82, 84 and 88 are preferably enclosed in one flexible envelope 45 (Fig. 5) which is provided with an index 45a to assure correct connection of the conduits to a nipple 102, one of which cooperates with each end of the envelope 45, being provided with a separate index 102a to cooperate with the index 45a. The nipple 102 has several tits 104 to cooperate with the separate conduits of the envelope to give a leak-proof connection.

Figures 6, 8:
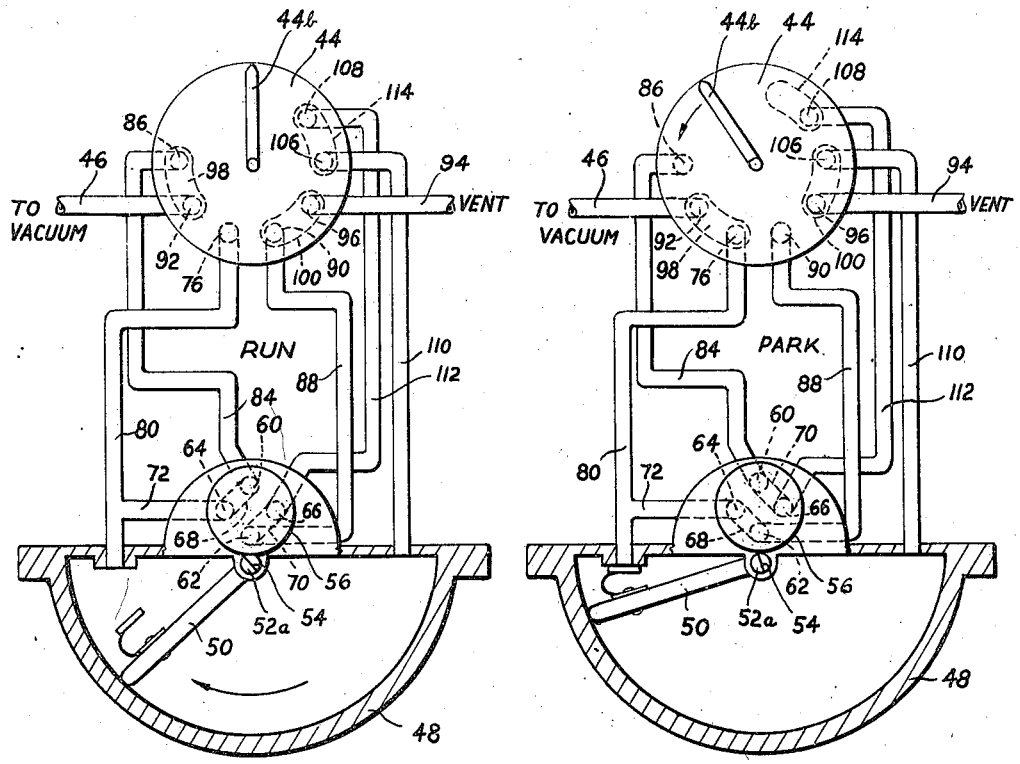
Fig. 6 is an elevational view, partly in section, showing a modification of the motor.
Fig. 8 is an elevational view, partly in section, showing the modified motor in parked position.
Figure 7:
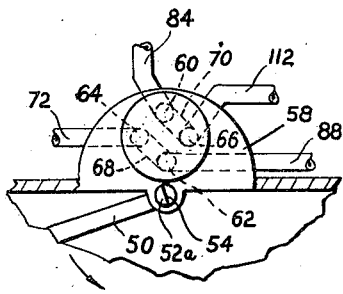
Fig. 7 is an elevational view of a detail.

In the preferred modification of the invention shown in Figs. 2, 3 and 4 only four conduits 80, 82, 84 and 88 are used to connect the manual control valve 44 to the motor 38, so that only four of the five conduits of the flexible envelope 45 are used. In Figs. 6, 7 and 8 a second form of the invention is shown in which five conduits are used to connect the manual control valve to the motor, the principal difference arising in the connection of the right chamber of the motor to the flop valve 56 and the manual control valve 44. For convenience in description, the same reference numerals in the corresponding ports are used and only that portion of the device which is different will be described in further detail. The movable portion 44b of the manual control valve in this modification is adapted to move in a counterclockwise direction for parking purposes, so that ports 76 and 86 are transposed with reference to port 92 leading to the source of vacuum. These ports control the left chamber of the motor.

In a similar manner port 90 is transposed with reference to vent port 96, while a pair of ports 106 and 108 is substituted in transposed position for port 78. Port 106, adjacent port 96, is in communication with the right side of the chamber by conduit 110, while port 108 is in communication with port 66 of the valve seat 58 by conduit 112. In this manner direct communication between port 66 and the right side of the chamber may be broken by the movement of the movable portion 44b of the manual control valve.

The movable portion 44b of the manual control valve is again provided with a pair of ducts 98 and 100, and with a third duct 114. Duct 98 cooperates with ports 86, 92 and 76, 92, placing them in communication selectively as shown in Figs. 6 and 8. Duct 100 cooperates with ports 90, 96 and 106, 96, placing them in communication in pairs simultaneously in the selective positions with the ports already described. Duct 114 cooperates with ports 106 and 108 only when movable portion 44b is in "run" position as shown in Fig. 6. In the second position for parking, port 108 is isolated and closed.

In the "run" position of this modification as shown in Fig. 6, the operation is similar to that of the modification shown in Figs. 2, 3 and 4, except that the communication between chamber port 66 and the right chamber is modified. Vacuum and atmosphere are placed in communication with port 66 by the flop valve 56 as already described, and from this port the flow is directed to port 108 of the manual control valve 44 by conduit 112 then through duct 114 to port 106, which is in communication with the right chamber of the casing by conduit 110. In the "park" position, ports 90 and 108 are shut off and conduits 88 and 112 isolated, while vent port 96 is connected to port 106 in communication with the right side of the chamber. Vacuum port 92 is connected to chamber port 76 by duct 98 to place vacuum on the left chamber of the casing for parking. Port 86 is closed to isolate conduit 84, while conduit 72 is isolated by closing of ports 86 and 90, no matter in what position the flop valve 56 is found at the time the operator moves the manual control valve 44 to "park" position.

Figures 5, 5A:
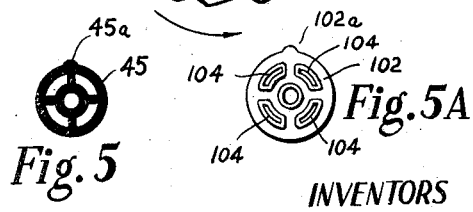
Fig. 5 is a plan view in cross section of a multi-passageway conduit.
Fig. 5A is a plan view of a connector.

Conduits 80, 84, 88, 110 and 112 are all led in a convenient manner to a nipple 102 (Fig. 5A) positioned on the casing 48 in any convenient position, and the five passageway hose 45, shown in Fig. 5, is positioned on the tits 104 of the nipple to establish communication therebetween. The manual control valve is also provided with a nipple 102 to cooperate with the other open end of the hose or envelope 45. Indexing means 45a and 102a are provided to establish the orientation of the conduits.

Figure 9:
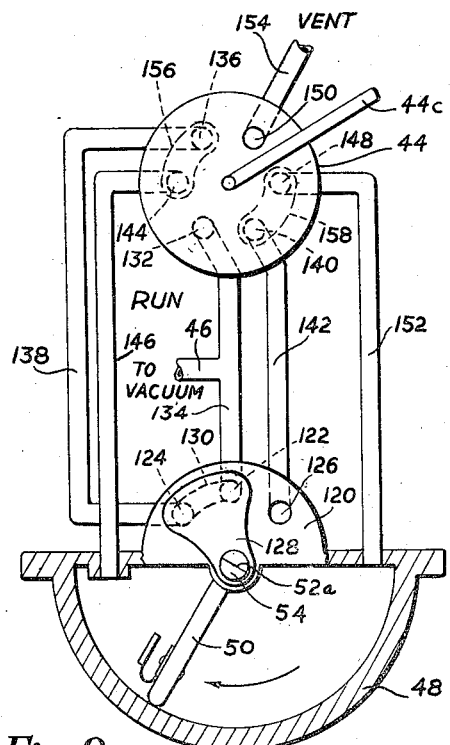
Fig. 9 is an elevational view, partly in section, of another modification of the motor.
Figure 11:
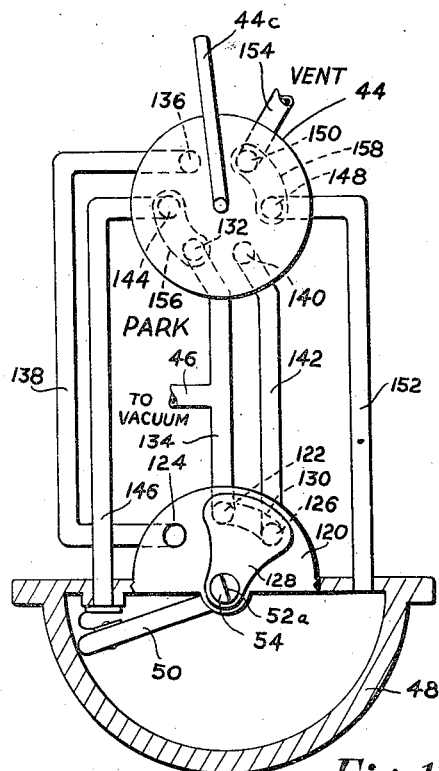
Fig. 11 is an elevational view, partly in section, of the motor in parked position.
Figure 10:
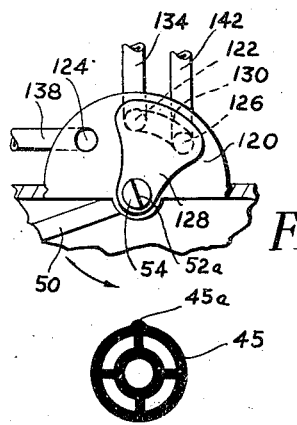
Fig. 10 is an elevational view of a detail.
Figure 12:
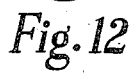
Fig. 12 is a view similar to Fig. 5.

In the modification shown in Figs. 9, 10 and 11, the casing 48 and vane 50 with its shaft 52 are the same. A modified valve seat 120 is provided pierced with three ports, a central suction supply port 122, and a pair of chamber ports 124 and 126, juxtaposed in spaced relation on opposite sides of port 122, preferably on an arc whose center is coaxial with shaft 52, so that a flop valve 128, which is preferably pivoted on the shaft 52, may alternately connect vacuum supply port 122 with the chamber ports 124 and 126 by means of duct 130 formed on the inner surface of the flop valve which cooperates with the valve seat 120. The flop valve is moved to its two positions by an automatic valve control mechanism (not shown) which may be of any of the well known types and driven by the non-circular portion 52a of the shaft. The flop valve 128 is moved to its alternate position when the vane is moving past a predetermined position so that the application of a fluid-pressure differential may be reversed to give the shaft 52 an oscillatory motion as has already been described with reference to the other modifications.

Vacuum supply port 122 may be at all times in communication with a source of vacuum by conduit 46, which may be connected directly to port 122 at the motor casing or may be connected to port 132 in the manual control valve 44 which communicates with port 122 by conduit 134.

Chamber port 124 in the valve seat 120 is in communication with port 136 in the manual control valve 44 by conduit 138, while chamber port 126 is in communication with port 140 by means of conduit 142. Positioned midway between ports 132 and 136, a port 144 is provided which communicates with the left chamber in the casing 48 by means of conduit 146. In a similar manner, port 148 is provided midway between ports 140 and a venting port 150, port 148 communicating with the right chamber in the casing 48 by conduit 152, while port 150 is open to atmosphere by conduit 154.

The movable portion 44c of the manual control valve is provided with a pair of ducts 156 and 158, the first of which (156) cooperates with ports 132, 144, and 136, 144, while the second (158) cooperates with ports 140, 148 and 150, 148 substantially as shown in Figs. 9 and 11. With the movable portion 44c in "run" position (Fig. 9), ports 136 and 144 are in communication by duct 156 while port 132 is closed, and ports 140 and 148 are in communication by duct 158 while port 150 is closed. Vacuum from the conduit 46 proceeds to port 122, then by duct 130 in the flop valve 128 to port 124, through conduit 138 to port 136, through duct 156 to port 144, and through conduit 146 to the left chamber of the casing 48. Atmospheric pressure enters exposed port 126 through conduit 142 to port 140, through duct 158 to port 148, and through conduit 152 to the right chamber of the casing to move the vane 50 in a clockwise direction. When the flop valve 128 moves to its alternate position (Fig. 10), port 124 will be exposed to atmospheric pressure while port 126 will be placed in communication with port 122 by duct 130 in the flop valve. Vacuum will then proceed from conduit 46 to port 122, through duct 130 in the flop valve 128 to port 126, through conduit 142 to port 140, through duct 158 in movable portion 44c to port 148, and through conduit 152 to the right chamber of the casing 48. Atmospheric pressure will enter exposed port 124, proceed through conduit 138 to port 136, through duct 156 in the movable portion 44c to port 144, then through conduit 146 to the left chamber of the casing 48. This will cause the vane 50 to move in a counterclockwise direction.

To park the wiper, the operator moves the movable portion 44c of the manual control valve in a counterclockwise direction from the "run" position shown in Fig. 9 to the "park" position shown in Fig. 11. Duct 156 will then place ports 132 and 144 in communication while duct 158 places port 148 in communication with venting port 150. The motor will park as shown in Fig. 11, by vacuum proceeding from conduit 46 through conduit 134 to ports 122 and 132. Port 122 will be isolated by stoppage of ports 136 and 140 in conjunction with duct 130 of the flop valve 128. Port 132 communicates by duct 156 with port 144, thence the vacuum proceeds through conduit 146 to the left chamber of the casing 48. Atmospheric pressure enters vent conduit 154 to port 150, then through duct 158 to port 148, and then through conduit 152 to the right chamber of the casing 48. This will park the motor irrespective of the position of the flop valve 128 at the left end of the casing. To start the motor again, the operator will again move the manual control valve to the "run" position shown in Fig. 9.

The five conduits 138, 146, 134, 142 and 152 may be combined in a unitary flexible envelope 45 as shown in Fig. 1. Nipples 102 with indexing means 102a are provided at its ends for convenient connection as has already been described in the other modifications.

It is to be understood that the above detailed description of the present invention is intended to disclose an embodiment thereof to those skilled in the art, but that the invention is not to be construed as limited in its application to the details of construction and arrangement of parts illustrated in the accompanying drawings, except as required by the appended claims, since the invention is capable of being practiced and carried out in various ways without departing from the spirit of the invention.

What is claimed is:

1. In a device of the class described, a motor having a casing including a portion movable therein when subject to a fluid-pressure differential, automatic valve means controllable by the movable portion to reverse the pressure differential at predetermined times with reference to the movable portion, a valve seat on the casing having four ports cooperating with the automatic valve means including a suction port, a pair of chamber ports in direct communication with the casing at opposite sides of the movable portion and a vent port capable of being opened to the atmosphere, a pair of cooperating passages on said valve means to place the suction and vent ports alternately in communication with the chamber ports to obtain reversal of said fluid-pressure differential, a manually movable central valve remote of the casing including a suction supply port, a pair of chamber ports at all times in communication with the chamber ports on the valve seat on the casing, an atmospheric port open at all times to the atmosphere, a suction port in communication at all times with the suction port in the valve seat on the casing, and a vent port in communication with the vent port on the valve seat, said control valve in one position establishing communication between the suction supply port and the suction port, the atmospheric port and the vent port and closing the two chamber ports, in second position establishing communication between the suction supply port and the atmospheric port with the chamber ports, closing the vent and suction ports.

2. In a device of the class described, a motor having a casing including a member movable therein when subject to a fluid pressure differential, primary chamber ports located on opposite sides of said movable member, a valve seat on said casing including a suction supply port and secondary chamber ports adjacent thereto, the secondary ports and the primary chamber ports leading to fluid passages, automatic valve means associated with said valve seat and controllable by the movable member for connecting the suction supply port alternately with one secondary port and the other secondary port to the atmosphere to obtain reversal of pressure differential for the operation of said movable member, remote control valve mechanism having fluid passages forming continuations of the passages of the primary chamber ports and valve seat ports, said continuation passages leading to ports on said control valve mechanism located adjacent to a vent port in communication at all times with the atmosphere, the remote control valve mechanism operable in one position to connect the suction supply to the primary chamber ports through the secondary chamber ports for the operation of the movable member and in a second position to connect one of the primary chamber ports directly to the suction supply and the other primary chamber port to the vent port on the control valve mechanism to park the movable member in one position.

RAYMOND E. UTTER.
D. HENRY STOLTENBERG.

REFERENCES CITED

The following references are of record in the file of this patent:

UNITED STATES PATENTS

| Number | Name | Date |
| --- | --- | --- |
| 1,674,056 | Oishei et al. | June 19, 1928 |
| 1,840,233 | Hueber | Jan. 5, 1932 |
| 1,891,670 | Ernst | Dec. 20, 1932 |
| 1,953,701 | Clark et al. | Apr. 3, 1934 |
| 2,257,066 | O'Shei | Sept. 23, 1942 |